Patented Apr. 27, 1937

2,078,625

UNITED STATES PATENT OFFICE 2,078,625

5-HYDROXY-HYDRINDENE-ORTHO-CARBOXYLIC ACID

Werner Zerweck, Ernst Korten, and Max Schubert, Frankfort-on-the-Main-Fechenheim, Germany, assignors to General Aniline Works, Inc., New York, N. Y., a corporation of Delaware No Drawing. Application October 4, 1935, Serial No. 43,510. In Germany October 4, 1934

1 Claim. (Cl. 260—110)

Our invention relates to a new compound of the hydrindene series and process of making same and particularly to a compound of the formula:

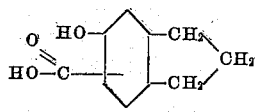

wherein the carboxylic acid radicle stands in ortho-position to the hydroxy group.

The new product is obtained on heating an alkali salt of 5-hydroxy-hydrindene with carbon dioxide, whereby a new ortho-hydroxycarboxylic acid is formed. This compound may be condensed according to known methods with an aliphatic, aromatic or heterocyclic amine in order to form the corresponding acid amide.

The new product may be used as an intermediate for the production of dyestuffs, particularly of azodyestuffs.

In order to further illustrate our invention the following examples are given; but we wish it, however, to be understood that our invention is not limited to the particular product or reaction conditions stated therein.

Example 1

50 parts of 5-hydroxy-hydrindene are heated with a caustic potash solution containing 23 parts of caustic potash in an autoclave provided with a stirrer and a descending cooler under a pressure of 15 mm. at about 160° C. to complete dryness. When cool, carbon dioxide is introduced under a pressure of 10 to 50 atmospheres. The mixture is then heated slowly to 160° C. and kept at this temperature for some hours.

The reaction product is then dissolved in water, filtered and the filtrate is precipitated by means of an acid; then it is isolated by filtration and washed in order to remove certain impurities. By dissolving in a hot sodium acetate solution and cooling a crystalline precipitate is obtained, which is then converted into the free 5-hydroxy-dydrindene- ortho-carboxylic acid. This acid of the probable formula:

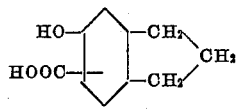

yields with ferric chloride a dark navy blue coloration and crystallizes from monochlorobenzene in colorless needles of melting point 198° C.

The same carboxylic acid is obtained by drying at first in vacuo, while stirring, the 5-hydroxy-hydrindene with an excess of caustic potash and treating the condensation product with carbon dioxide; by using instead of the free caustic potash an equivalent amount of caustic soda and working otherwise as indicated above, the same acid results.

Example 2

A current of carbon dioxide of moderate speed is introduced at a starting temperature of 100° C. while stirring intensely, into an autoclave provided with an oilbath and a strong stirring apparatus, containing 120 parts of the dry potassium salt of the 5-hydroxy-hydrindene. Simultaneously the temperature is brought up to 200° C. during 6 hours. A certain quantity of free 5-hydroxyhydrindene together with passing gases are blown away through a joining wide cooler. The hydroxyhydrindene solidifies in the cooler.

Then the residue remaining in the vessel is dissolved in water and filtered, the filtrate is acidified by means of hydrochloric acid, filtered and washed with water in order to remove certain impurities. The crude acid is then dissolved in a dilute acetate solution as described in Example 1, filtered and reciprocated by means of hydrochloric acid.

The 5-hydroxy-hydrindene-ortho-carboxylic acid thus obtained with a good yield is identical to that obtained according to Example 1.

Example 3

A mixture of 17.8 parts of 5-hydroxy-hydrindene-ortho-carboxylic acid, obtained according to Example 1, 300 parts of toluene and 9.3 parts of aniline is heated to about 70° C. and into this mixture 6 parts of phosphorus trichloride are allowed to flow at the same temperature while stirring. Then the mass is heated to boiling until the evolution of hydrochloric acid ceases, the mass is poured into a sodium carbonate solution, the toluene is blown out with steam, the residual mass is filtered off and the residue is washed with water. The anilide thus obtained of the formula:

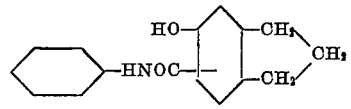

may be purified by dissolving it in a dilute caustic soda solution and acidifying by means of hydrochloric acid. It is easily soluble in chlorobenzene, difficultly soluble in petrol and glacial acetic acid, from which it crystallizes in bundles of colorless needles of melting point 187° C.

*Example 4*

8 parts of 5-hydroxy-hydrindene-o-carboxylic acid are heated to 70° C. with the addition of 150 parts of dimethylaniline and 12 parts of β-naphthylamine. At the same temperature 5 parts of phosphorous trichloride are allowed to drop in, while stirring, whereby a clear solution is formed. The mass is again heated during some hours to 100–105° C., poured into an excess of hydrochloric acid, then filtered and washed with water until acid-free. The β-naphthylamide of 5-hydroxy-hydrindene-ortho-carboxylic acid thus obtained of the formula:

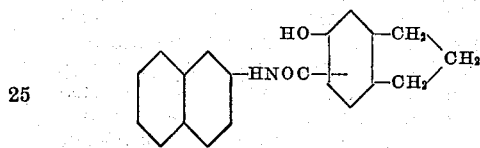

may be purified by dissolving it in a dilute caustic alkali solution, filtration and acidification by means of hydrochloric acid. It is rather soluble in benzene, difficultly soluble in glacial acetic acid and crystallizes therefrom in colorless prisms of melting point 229° C.

In the same manner further arylides may be obtained, generally being colorless crystalline powders; the α-naphthylamide thus obtained melts in a pure state at 210° C., the condensation product of the 5-hydroxyhydrindene-ortho-carboxylic acid with para-chloraniline melts in a pure state at 230° C., that with chloroaminohydroquinonedimethylether of the formula:

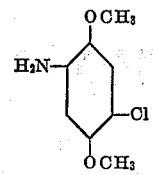

at 195° C., that with chloroaminoresorcinedimethylether of the formula:

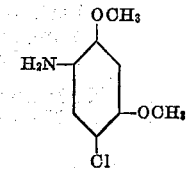

at 210° C., with para-aminodiphenyl at 255° C., the condensation product of two molecular proportions of the 5-hydroxyhydrindene-ortho-carboxylic acid with one molecular proportion of benzidine melts above 290° C., of ortho-tolidine above 300° C., of dianisidine at 285° C., and of 2.2′-dichlorobenzidine above 300° C.

We claim:

The 5-hydroxy-hydrindene - ortho - carboxylic acid of the formula:

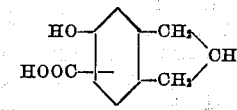

which crystallizes in colorless needles of 198° C. melting point and yields with ferric chloride a dark navy blue coloration.

WERNER ZERWECK.
ERNST KORTEN.
MAX SCHUBERT.